United States Patent
Dorsey-Palmateer et al.

(10) Patent No.: US 10,421,191 B2
(45) Date of Patent: Sep. 24, 2019

(54) DUAL HIDDEN POINT BARS

(71) Applicant: The Boeing Company, Chicago, IL (US)

(72) Inventors: John Willard Dorsey-Palmateer, Gig Harbor, WA (US); Michael Richard Kennedy, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 15/496,173

(22) Filed: Apr. 25, 2017

(65) Prior Publication Data
US 2017/0291304 A1 Oct. 12, 2017

Related U.S. Application Data

(63) Continuation of application No. 14/078,230, filed on Nov. 12, 2013, now Pat. No. 9,874,628.

(51) Int. Cl.
*B25J 11/00* (2006.01)
*B21J 15/28* (2006.01)
(Continued)

(52) U.S. Cl.
CPC ........... *B25J 11/007* (2013.01); *B21J 15/142* (2013.01); *B21J 15/28* (2013.01); *B25J 13/089* (2013.01);
(Continued)

(58) Field of Classification Search
CPC ...... B25J 11/007; B25J 13/089; B21J 15/142; B21J 15/28; G01S 17/06; G01S 7/4808;
(Continued)

(56) References Cited

U.S. PATENT DOCUMENTS 4,621,926 A 11/1986 Merry et al.
4,762,261 A * 8/1988 Hawly ...................... B21J 15/14
227/111
(Continued)

FOREIGN PATENT DOCUMENTS

CN 101583536 A 11/2009
CN 101646512 A 2/2010
(Continued)

OTHER PUBLICATIONS

Office Action, dated Jun. 5, 2017, regarding U.S. Appl. No. 14/078,230, 26 pages.
(Continued)

*Primary Examiner* — Mohammad K Islam
(74) *Attorney, Agent, or Firm* — Yee & Associates, P.C.

(57) ABSTRACT

A system is provided including a first elongated object proximate a first surface on a first side of a structure and a second elongated object proximate a second surface on a second side of the structure, the second surface and the second side opposite the structure relative to the first surface and the first side, the first object aligned with the second object at a first point on the first surface. The system also includes a first plurality of corner cubes affixed to the first object at first known distances from each other and from the first point, wherein the first object abuts the first surface at the first point. The system also includes a second plurality of corner cubes affixed to the second object at second known distances from each other and from the first point, wherein the second object abuts second surface at second point opposite first point.

20 Claims, 6 Drawing Sheets

(51) Int. Cl.

| | | |
|---|---|---|
| *G01S 17/06* | (2006.01) | |
| *B25J 13/08* | (2006.01) | |
| *G01S 7/48* | (2006.01) | |
| *B64F 5/10* | (2017.01) | |
| *G01B 21/04* | (2006.01) | |
| *G01B 11/00* | (2006.01) | |
| *G01S 17/66* | (2006.01) | |
| *B21J 15/14* | (2006.01) | |

(52) U.S. Cl.
CPC .............. *B64F 5/10* (2017.01); *G01B 11/002* (2013.01); *G01B 21/042* (2013.01); *G01S 7/4808* (2013.01); *G01S 17/06* (2013.01); *G01S 17/66* (2013.01); *G05B 2219/45088* (2013.01); *Y10S 901/01* (2013.01)

(58) Field of Classification Search
CPC ......... G01S 17/66; B64F 5/10; G01B 11/002; G01B 21/042; G05B 2219/45088; Y10S 901/01

See application file for complete search history.

(56) References Cited

U.S. PATENT DOCUMENTS

| | | | | |
|---|---|---|---|---|
| 5,023,800 | A * | 6/1991 | Carver | G05B 19/4097 |
| | | | | 700/182 |
| 5,161,936 | A * | 11/1992 | Kato | B25J 9/0084 |
| | | | | 414/728 |
| 5,191,817 | A * | 3/1993 | Kojima | B23B 3/06 |
| | | | | 82/1.11 |
| 5,371,836 | A * | 12/1994 | Mitomi | G05B 19/4182 |
| | | | | 700/245 |
| 5,374,830 | A * | 12/1994 | Pryor | B25J 9/1692 |
| | | | | 250/559.3 |
| 5,429,009 | A * | 7/1995 | Wolfe | B62D 57/032 |
| | | | | 180/8.5 |
| 5,440,392 | A * | 8/1995 | Pettersen | G01B 11/00 |
| | | | | 356/601 |
| 5,805,287 | A * | 9/1998 | Pettersen | G01B 11/245 |
| | | | | 356/614 |
| 5,987,591 | A * | 11/1999 | Jyumonji | B25J 9/1697 |
| | | | | 700/259 |
| 6,052,190 | A | 4/2000 | Sekowski et al. | |
| 6,073,056 | A | 6/2000 | Gawronski et al. | |
| 6,106,464 | A | 8/2000 | Bass et al. | |
| 6,167,607 | B1 * | 1/2001 | Pryor | A01B 69/008 |
| | | | | 29/407.04 |
| 6,230,382 | B1 * | 5/2001 | Cunningham | B64F 5/10 |
| | | | | 29/407.04 |
| 6,615,112 | B1 * | 9/2003 | Roos | B25J 9/1692 |
| | | | | 318/568.1 |
| 6,822,412 | B1 * | 11/2004 | Gan | B25J 9/1692 |
| | | | | 318/568.11 |
| 7,013,191 | B2 * | 3/2006 | Rubbert | G16H 50/50 |
| | | | | 700/98 |
| 7,285,793 | B2 | 10/2007 | Rusted | |
| 8,301,302 | B2 * | 10/2012 | Sarh | B25J 9/1682 |
| | | | | 700/245 |
| 8,918,208 | B1 * | 12/2014 | Hickman | B25J 9/1697 |
| | | | | 700/253 |
| 9,645,012 | B2 * | 5/2017 | Marsh | H04N 5/332 |
| 2001/0006420 | A1 | 7/2001 | Kato | |
| 2002/0015934 | A1 * | 2/2002 | Rubbert | A61C 7/00 |
| | | | | 433/29 |
| 2003/0217997 | A1 * | 11/2003 | Clauer | G01N 21/95 |
| | | | | 219/121.85 |
| 2004/0066508 | A1 | 4/2004 | Schmadel | |
| 2005/0273199 | A1 * | 12/2005 | Ban | B25J 9/1682 |
| | | | | 700/248 |
| 2006/0181236 | A1 * | 8/2006 | Brogardh | B25J 9/1671 |
| | | | | 318/568.1 |
| 2007/0016386 | A1 | 1/2007 | Husted | |
| 2008/0009697 | A1 * | 1/2008 | Haider | A61B 17/15 |
| | | | | 600/407 |
| 2008/0172857 | A1 | 7/2008 | Brinkworth et al. | |
| 2010/0192376 | A1 * | 8/2010 | Frauen | B64F 5/10 |
| | | | | 29/897.2 |
| 2011/0137461 | A1 * | 6/2011 | Kong | G05D 1/0225 |
| | | | | 700/253 |
| 2011/0170534 | A1 * | 7/2011 | York | H04J 3/0667 |
| | | | | 370/350 |
| 2011/0245971 | A1 * | 10/2011 | Sarh | B25J 9/1682 |
| | | | | 700/248 |
| 2012/0011693 | A1 * | 1/2012 | Amirehteshami | B23P 21/002 |
| | | | | 29/428 |
| 2012/0072021 | A1 * | 3/2012 | Walser | B25J 9/1697 |
| | | | | 700/254 |
| 2012/0136475 | A1 * | 5/2012 | Kahle | G01S 5/0221 |
| | | | | 700/182 |
| 2012/0197438 | A1 * | 8/2012 | Ogami | B25J 9/1682 |
| | | | | 700/258 |
| 2013/0079928 | A1 * | 3/2013 | Soe-Knudsen | B25J 9/1656 |
| | | | | 700/248 |
| 2013/0132038 | A1 * | 5/2013 | Regan | G06F 17/50 |
| | | | | 703/1 |
| 2013/0190925 | A1 * | 7/2013 | Miyoshi | B25J 15/00 |
| | | | | 700/245 |
| 2013/0195349 | A1 * | 8/2013 | Yamashita | G06T 15/80 |
| | | | | 382/154 |
| 2013/0204422 | A1 * | 8/2013 | Ross | B21D 31/04 |
| | | | | 700/117 |
| 2013/0256457 | A1 * | 10/2013 | Goehlich | B64C 1/068 |
| | | | | 244/120 |
| 2013/0258353 | A1 | 10/2013 | Kosmecki et al. | |
| 2013/0333731 | A1 * | 12/2013 | Kato | B08B 3/04 |
| | | | | 134/32 |
| 2014/0098383 | A1 * | 4/2014 | Bridges | G01C 15/002 |
| | | | | 356/614 |
| 2014/0132729 | A1 * | 5/2014 | Foulk | G01N 21/9515 |
| | | | | 348/46 |
| 2014/0220249 | A1 * | 8/2014 | Rouaud | B05B 12/02 |
| | | | | 427/256 |
| 2014/0256457 | A1 * | 9/2014 | Nakamura | F16P 1/02 |
| | | | | 464/170 |
| 2014/0293023 | A1 * | 10/2014 | Sherman | G01C 11/00 |
| | | | | 348/54 |
| 2014/0329001 | A1 * | 11/2014 | Rouaud | B05B 12/084 |
| | | | | 427/9 |
| 2014/0329013 | A1 * | 11/2014 | Rouaud | B05D 1/32 |
| | | | | 427/282 |
| 2015/0134104 | A1 | 5/2015 | Dorsey-Palmateer et al. | |
| 2015/0314892 | A1 * | 11/2015 | DesJardien | B64F 5/50 |
| | | | | 29/559 |

FOREIGN PATENT DOCUMENTS

| | | |
|---|---|---|
| CN | 102057269 A | 5/2011 |
| CN | 103158845 A | 6/2013 |
| GB | 2372809 A | 9/2002 |
| WO | WO2012110635 A1 | 8/2012 |

OTHER PUBLICATIONS

Canadian Office Action, dated Jul. 4, 2017 regarding U.S. Appl. No. 14/078,230, 3 pages.
Japanese Notice of Reasons for Rejection and English translation, dated Jul. 23, 2018, regarding Application No. 2014-219031, 11 pages.
Notice of Allowance, dated Sep. 13, 2017 regarding U.S. Appl. No. 14/078,230, 10 pages.
China National Intellectual Property Administration Second Notification of Office Action with English Translation, dated Nov. 2, 2018, regarding Application No. 201410645865.3, 10 pages.
Partial European Search Report, dated Apr. 20, 2015, regarding Application No. EP14192760.8, 5 pages.
Extended European Search Report, dated Sep. 30, 2015, regarding Application No. EP14192760.8, 10 pages.

(56) References Cited

OTHER PUBLICATIONS

Canadian Office Action dated Nov. 24, 2015, regarding application No. 2863924, 3 pages.
Canadian Intellectual Property Office Communication, dated Sep. 22, 2016, regarding Application No. 2,863,924, 4 pages.
Office Action, dated Sep. 8, 2016, regarding U.S. Appl. No. 14/078,230, 15 pages.
Final Office Action, dated Feb. 21, 2017, regarding U.S. Appl. No. 14/078,230, 17 pages.
State Intellectual Property Office of PRC, Notification of First Office Action and English translation dated Feb. 5, 2018, regarding Application No. 201410645865.3, 14 pages.
Canadian Office Action, dated Jul. 4, 2017 regarding USPTO Application No. 2,863,924, 3 pages.

* cited by examiner

DUAL HIDDEN POINT BARS

This application is a continuation application of U.S. patent application Ser. No. 14/078,230, filed Nov. 12, 2013, which issued as U.S. Pat. No. 9,874,628.

BACKGROUND INFORMATION

1. Field

The present disclosure relates generally to measurement systems used in manufacturing of aircraft and, in particular, to aligning coordinate systems of external and internal aircraft volumes during aircraft manufacture to maneuver robots and other devices on the opposing aircraft surfaces in concert.

2. Background

Manufacturers of aircraft and other complex products may require precision in placement of components in their products. An aircraft maker may install many thousands of rivets, fasteners, and other components in various locations in an aircraft fuselage during manufacturing. Ensuring that the correct rivet is placed in the intended rivet hole may present challenges. Installing a rivet in the fuselage of a jet aircraft during manufacturing or maintenance may require simultaneous controlled movement of a rivet assembly and tooling on both the inside and outside surfaces of the fuselage. Instruments on the opposite surfaces of the fuselage panel must be positioned at the correct locations or the rivet or other component will not be installed properly.

SUMMARY

The illustrative embodiments provide for a system. The system includes a first elongated object proximate to a first surface on a first side of a structure. The system also includes a second elongated object proximate to a second surface on a second side of the structure, the second surface and the second side being opposite the structure relative to the first surface and the first side, the first elongated object aligned with the second elongated object at a first point on the first surface. The system also includes a first plurality of corner cubes affixed to the first elongated object at first known distances from each other and from the first point, wherein the first elongated object abuts the first surface at the first point. The system also includes a second plurality of corner cubes affixed to the second elongated object at second known distances from each other and from the first point, wherein the second elongated object abuts the second surface at a second point opposite the first point.

The illustrative embodiments also provide for a method. The method is implemented using a system comprising a first, a second, and a third pair of elongated objects wherein each pair of elongated objects comprises a first elongated object and a second elongated object positioned at one of a first point, a third point, and a fifth point on opposite first and second surfaces, respectively, of a structure and wherein each of the first and second elongated objects in the first, the second, and the third pair contains a first plurality and a second plurality, respectively of corner cubes affixed at known distances from each other on the first and second elongated objects and from the first point, the third point, and the fifth point, respectively, on the first surface. The method includes a first measurement device disposed proximate the first surface directing first measurements at the first plurality of corner cubes on each of the first elongated objects. The method also includes receiving, at the first measurement device, first reflected measurement from the first plurality of corner cubes on each of the first elongated objects. The method also includes a second measurement device disposed proximate the second surface directing second measurements at the second plurality of corner cubes on each of the second elongated objects on the second surface. The method also includes receiving, at the second measurement device, second reflected measurements from the second plurality of corner cubes on each of the second elongated objects. The method also includes measuring a first coordinate system of the first surface using the first reflected measurements. The method also includes measuring a second coordinate system of the second surface using the second reflected measurement. The method also includes mapping the second coordinate system to the first coordinate system.

The illustrative embodiments also provide for a computer-implemented method of establishing a coordinate measurement reference on a surface at predetermined locations. The method includes a computer receiving first, second, and third reference coordinates of a first point, a third, point, and a fifth, point, respectively, on a first surface. The method also includes the computer receiving fourth, fifth, and sixth reference coordinates of a second point, a fourth, point, and sixth point, respectively, on a second surface, wherein the second surface and the first surface comprise opposite sides of a structure and wherein the first point, the second point, and the third point and the fourth point, a fifth point, and sixth point are about collocated, respectively, opposite each other on the opposite sides. The method also includes the computer mapping the second, fourth, and sixth reference coordinates to the first third, and fifth reference coordinates, respectively, in a first coordinate system of the first surface. The method also includes the computer, based on the mapping, adapting a second coordinate system of the second surface to the first coordinate system, wherein the first, third, and fifth reference coordinates and the second, fourth, and sixth reference coordinates are determined using measurements directed at targets positioned at known distances from the first point, the third, point, and fifth point, respectively.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Using human technicians to install thousands of small components in an aircraft may be prohibitively expensive and prone to errors. When a large quantity of small components are to be installed in a fuselage, directing teams of technicians to move about and work in concert on opposite sides of the fuselage may be costly and result in production problems and delays. Even if holes are predrilled, as is the case with many large aircraft, directing two teams on opposite sides to locate the correct hole among thousands of predrilled holes may be exceedingly time-consuming.

Aircraft manufacturers and others have turned to using computerized robots or other devices to install rivets and other metal, plastic, and composite components into an aircraft during production. Robots may install components with more precision, accuracy, consistency, and speed than human technicians. When thousands of components are to be installed, robots may yield significant productivity and quality advantages over human installers.

While robots may offer various advantages over human technicians when installing rivets and other components in an aircraft fuselage, aircraft manufacturers are still faced with the problem of coordinating movement of the robots on the opposite sides of the fuselage. Robots on opposite sides must move to the correct hole or other location wherein they will install a component or perform other actions.

Aircraft manufacturers typically use a coordinate system of the inside surface of a fuselage to locate and place components. While reference points on the smooth external surface of a fuselage may be few, more easily visible reference points are found on the inside surface and may include frames and side rails. Manufacturers refer to an inside mold line (IML), a framework for describing internal surfaces and meeting points, creases, and lines wherein internal surfaces may meet. An interior coordinate or measurement system is linked to inside mold lines and provides an airplane coordinate frame.

Internal coordinate measurement points are identified for drilling of holes and placement of components. Pinpointing an identical coordinate measurement point on an exterior and interior skin surface presents continuing challenges. Exterior and interior surfaces are usually curved, if only slightly in places, and therefore do not have the same shapes.

Coordinate measurement systems have been developed that attempt to overcome differences in external and internal coordinate systems and may promote identifying a single point for both external and internal reference. Tools including targets for calibrating measurement have historically been employed. In some instances, targets have been placed in window openings. Such placement may result in unsatisfactory geometry because the targets are situated along a line. Coordination may be limited to taking place along a window belt. Window targets may also have multiple targets, typically three or four, which may require calibration or certification on a coordinate measurement machine (CMM). Further, window targets cannot be used on freighter aircraft.

Thus, effective new techniques for more accurately coordinating identification of points on opposite sides of aircraft surfaces, including fuselage skin are desirable.

The illustrative embodiments recognize and take into account the issues described above with respect to coordinating movement of robots and other objects on opposite surfaces of a structure, for example an aircraft fuselage, based on identifying corresponding points on the opposite surfaces. The illustrative embodiments recognize challenges faced by manufacturers in placing thousands of metal and composite rivets, fasteners, and other components in various surfaces of aircraft fuselages and other products. Methods and systems are provided to support movement and positioning of objects on a first surface based on a coordinate system of a second surface wherein the first and second surfaces are on opposite sides of a structure such as a skin of an aircraft fuselage.

The illustrative embodiments may determine spatial coordinates in an internal coordinate system for a point on an internal surface of a fuselage. The illustrative embodiments determine spatial coordinates in a coordinate system for an external surface of the same internally located point. By completing the process of determining spatial coordinates in two spatial coordinate systems for three separately located points on the internal surface, the illustrative embodiments enable mapping the external coordinate system to the internal coordinate system. The three separate points may be three separate predrilled holes for placement of rivets in the aircraft fuselage. Objects moving about the external surface may then do so according to the internal coordinate system.

An aircraft manufacturer may deploy robots on the opposite surfaces to move to the same hole. The illustrative embodiments may provide methods and systems that may enable a robot on an external surface of an aircraft to move in accordance with the internal coordinate frame system of the aircraft. Such movement and alignment may be accomplished by mapping the external coordinate system to the internal coordinate system.

The illustrative embodiments may provide dual hidden point bars wherein on either side of a rivet hole, for example, bars that may be of similar dimension and composition are placed lengthwise to their respective surfaces at the rivet hole. A first bar is positioned on the internal fuselage surface with one end at the rivet hole. A second bar is positioned on the external surface, also with one end at the rivet hole. The placement of the bars may be perpendicular to their respective surfaces. The bars may be connected to each other through the hole such that the bars are held stationary and that the ends of each bar proximate their respective surfaces are flush to the surfaces.

Affixed to each bar on either side of the fuselage may be reflectors, possibly spherically-mounted reflectors, two corner cubes, or crystal objects, which reflect laser beams. For both the internally placed bar and the externally placed bar, distances between the at least two corner cubes are known. For the bar positioned at the interior surface, the distances between each of the corner cubes and the interior surface is known. For the bar positioned at the external surface, the distances between each of its corner cubes and the point at which the internally-placed bar meets the internal surface are also known. Distances for the bar positioned at the external surface may rely on knowledge of the thickness of the aircraft fuselage at the subject rivet hole where the bars meet. Knowledge about these distances may be used in adapting an external coordinate frame for the fuselage with an internal coordinate frame for the fuselage and may enable harmonious movement of objects, for example robots, on the external and internal surfaces of the fuselage.

The illustrative embodiments may provide for measurement devices to be positioned near the opposite surfaces of the structure. Each measurement device may project laser beams at the corner cubes on the bar placed on their respective side of the structure. The corner cubes reflect the received laser beams or other forms of light back to their respective measurement device. The measurement devices, which may be tracking interferometers, may use measures of the projected and reflected light to determine distances to the corner cubes. Based on these measured distances as well as the known distances between corner cubes and from the corner cubes to the point where the internally-placed bar touches the internal surface, vectors may be calculated. Based on the vectors and other known measures including thickness of aircraft fuselage, the distances from corner cubes on bars on both sides of the structure to the point at which the internally placed bar contacts the internal surface may be calculated.

The illustrative embodiments recognize that surfaces of an object may be three-dimensional. Thus, measuring the location of a single point in space may not be sufficient in establishing positioning of a three-dimensional object in a three-dimensional space. The illustrative embodiments thus provide for the use of three pairs of internal and externally placed bars to be positioned at three separate points on the aircraft fuselage. At least one measurement device on each side of the structure projects laser beams or other light at corner cubes on each of three bars on each side. Spatial locations of each of three points of interest wherein the three internally placed bars meet the internal surface may be determined. An internal coordinate frame for the aircraft fuselage may be adapted to the three measured points.

Because distances are also determined from corner cubes placed on externally placed bars, distances from those corner cubes to the three points of interest wherein the three internally placed bars meet the internal surface may be determined. Based on these determined distances, an external coordinate frame adapted to the locations of the external corner cubes determined by the externally positioned measurement device may be adapted to the internal coordinate frame. The external coordinate frame is effectively mapped to the internal coordinate frame. Robots and other devices and objects moving on the external surface of an aircraft fuselage or other structure do so in accordance with the internal coordinate frame. Robots positioned on both sides of the fuselage consequently may move according to a single coordinate frame, the internal coordinate frame, and more accurate positioning may take place. Increased accuracy in the correct placement of rivet or other hardware into the fuselage may result.

The illustrative embodiments also provide for measurements of points of interest on aircraft fuselages or other surfaces that are not associated with holes in the surfaces. In such instances, the bars on opposite sides of a surface may be maintained in a virtual connection through the use of magnets placed on or inside the bars. Rollers that may be made of ceramic or other suitable substance may be mounted to the ends of the bars near their respective surfaces. The rollers may allow movement of the bars to achieve proper positioning. Knowledge of the thickness of aircraft skin may be needed for accurate computations.

Figure 1A:
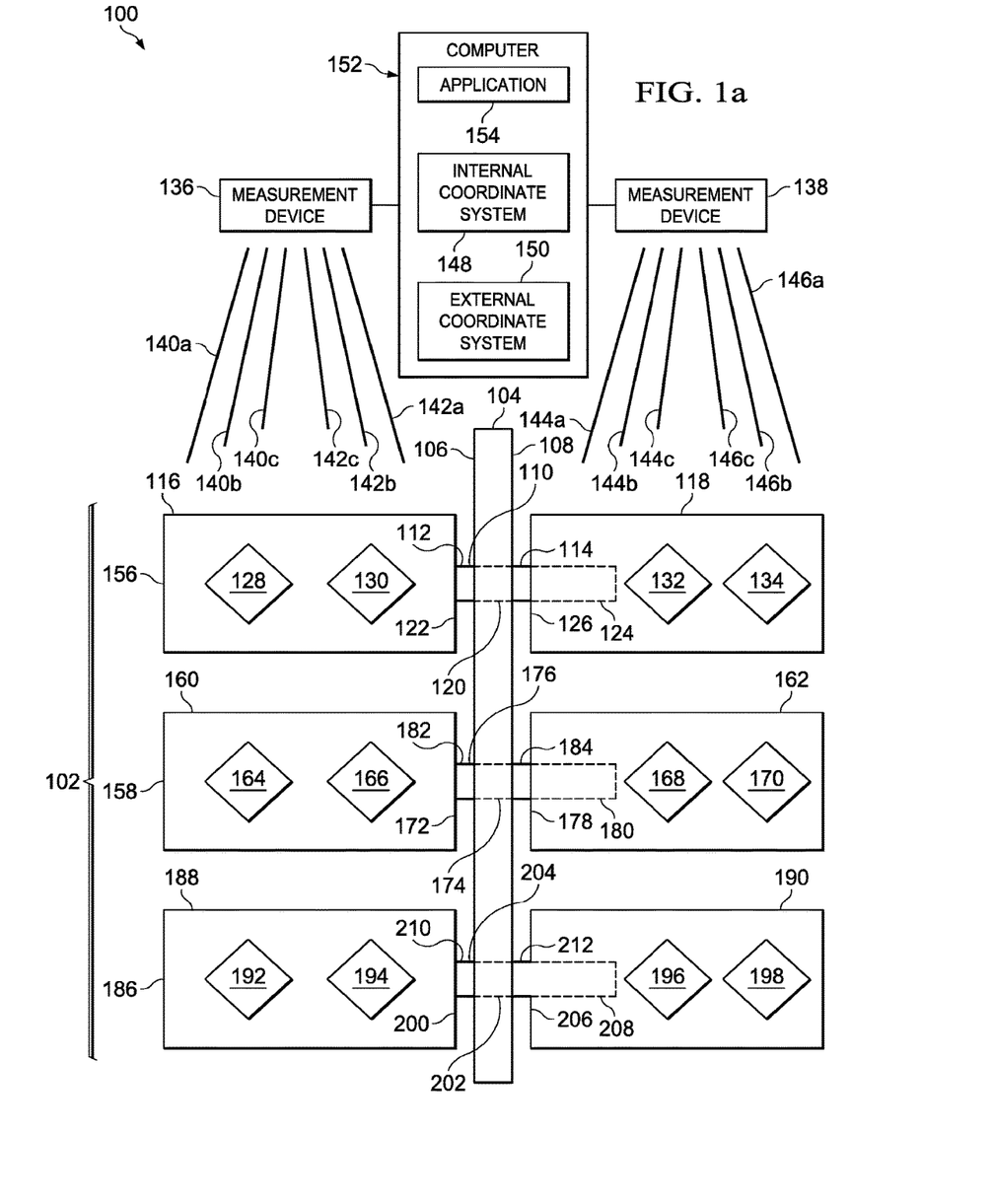
FIG. 1a is a block diagram of a system of dual hidden point bars in accordance with an illustrative embodiment.

Attention is now turned to the figures. FIG. 1*a* is a block diagram of a system of dual hidden point bars in accordance with an illustrative embodiment.

System 100 may include aircraft 102. Aircraft 102 also may be described with respect to FIG. 6. System 100 also may include structure 104 that may be a skin of aircraft 102. Structure 104 may be made of metal or another material. Structure 104 includes a first side 106 and a second side 108. In an embodiment, first side 106 may be an inside surface of structure 104 of aircraft 102 and second side 108 may be an exterior surface of structure 104 of aircraft 102. System 100 also includes first hole 110 in structure 104 through which a rivet, fastener, or other hardware component may be placed. System 100 also comprises a first point 112 that is a location of first hole 110 on first side 106. System 100 also comprises a second point 114 that is a location of first hole 110 on second side 108. First point 112 and second point 114 are effectively opposite sides of first hole 110, on interior and exterior surfaces of structure 104, respectively.

System 100 also includes first bar 116 and second bar 118 that may be situated on first side 106 and second side 108, respectively, of structure 104. First side 106 includes shank 120 that may protrude from first end 122 of first bar 116 abutting first side 106 at first point 112. Second bar 118 includes second hole 124. Second hole 124 is located at second end 126 of second bar 118 abutting second side 108 at second point 114. The diameter of second hole 124 may be approximately the diameter of shank 120 such that shank 120 may fit into second hole 124 in a snug manner. Further, the depth of second hole 124 may be approximately the length of shank 120 minus the thickness of structure 104 at first point 112 and at second point 114.

Shank 120 protruding from first end 122 of first bar 116 may be inserted through first hole 110 of structure 104 at first point 112. Shank 120, emerging from first hole 110 on second side 108 of structure 104 at second point 114, may be inserted into second hole 124 of second bar 118. Shank 120 may be inserted completely inside second hole 124 in second bar 118 such that first end 122 of first bar 116 and second end 126 of second bar 118 may abut structure 104 at first point 112 and second point 114, respectively.

System 100 also includes corner cube 128, corner cube 130, corner cube 132, and corner cube 134 that are spherically-mounted optical corner reflectors and may be made of three mutually perpendicular mirrors. Although the illustrative embodiments refer to a "corner cube" other types of suitable reflective optics may be used, including cat's eye retro-reflector, or other reflective surfaces in different types of arrangement that reflect light in the desired directions. Thus, the term "corner cube" as used throughout this document does not necessarily limit the claimed inventions.

Corner cube 128 and corner cube 130 are affixed to first bar 116 in a linear manner in line with first point 112. Corner cube 132 and corner cube 134 are similarly affixed to second bar 118 in a linear manner in line with second point 114. In an embodiment, more than two corner cube 128 and corner cube 130 are affixed to first bar 116. In an embodiment, more than two corner cube 132 and corner cube 134 are affixed to second bar 118. Corner cube 128 and corner cube 130 may be situated in a recessed manner on first bar 116 provided they are aligned with the first point 112. Corner cube 132 and corner cube 134 may be situated in a recessed manner on second bar 118 provided they are aligned with second point 114.

The distances between each of corner cube 128 and corner cube 130 and first point 112 are known. Thus the distance between corner cube 128 and corner cube 130 is known. The distances between each of corner cube 132 and corner cube 134 and second point 114 are known. Thus the distance between corner cube 132 and corner cube 134 is known.

The distances between each of corner cube 132 and corner cube 134 and first point 112 are also determined. The distances may be determined by adding the thickness of structure 104 at first hole 110 to the distances from each of corner cube 132 and corner cube 134 to second point 114. The distances may alternatively be determined by supplementing knowledge of the distances from each of corner cube 132 and corner cube 134 to second point 114 with knowledge about the length of shank 120 and depth of second hole 124.

System 100 also includes measurement device 136 and measurement device 138. Measurement device 136 and measurement device 138 may be spherical coordinate measurement systems that measure horizontal angles, vertical angles, and ranges of points in space. However, measurements in other coordinate systems, such as Cartesian or cylindrical, may be used if suitable for different applications. Measurement device 136 and measurement device 138 may be tracking interferometers.

Measurement device 136 and measurement device 138 convert their measurements of locations of points in space into spatial x, y, and z coordinates in mathematical representations of three-dimensional space. Measurement device 136 is positioned at first side 106 of structure 104 and projects laser beam 140a and laser beam 142a to corner cube 128 and corner cube 130, respectively. Measurement device 138 is positioned at second side 108 of structure 104 and projects laser beam 144a and laser beam 146a to corner cube 132 and corner cube 134, respectively. As used herein the term "laser beam" may also refer to other forms of light or measurement. For example, a diode or other light source may be used that produces either coherent or non-coherent light. Thus, the term "laser beam" as used throughout this document does not necessarily limit the claimed inventions. Nevertheless, in some illustrative embodiments, the use of actual lasers may be advantageous due to the highly controllable properties of the light output.

Corner cube 128 and corner cube 130 reflect laser beam 140a and laser beam 142a, respectively, back to measurement device 136. Corner cube 132 and corner cube 134 reflect laser beam 144a and laser beam 146a, respectively, back to measurement device 136.

Measurement device 136 receives reflected laser beam 140a and reflected laser beam 142a from corner cube 128 and corner cube 130, respectively. Measurement device 138 receives reflected laser beam 144a and reflected laser beam 146a from corner cube 132 and corner cube 134, respectively. Measurement device 136 analyzes reflected laser beam 140a and reflected laser beam 142a to determine locations of corner cube 128 and corner cube 130, respectively, relative to each other and measurement device 136. Similarly, measurement device 138 analyzes reflected laser beam 144a and reflected laser beam 146a to determine locations of corner cube 132 and corner cube 134, respectively, relative to each other and measurement device 138.

Based on its location calculations on first side 106, measurement device 136 may then determine spatial x, y, and z location coordinates in internal coordinate system 148 for each of corner cube 128 and corner cube 130. However, as indicated above, other coordinate systems may be used and measured. Based in part on the known locations of each of each of corner cube 128 and corner cube 130 relative to first point 112, the location coordinates of first point 112 in internal coordinate system 148 may be calculated. Internal coordinate system 148 may be a spatial coordinate system for the first side 106 of structure 104, which may be the interior surface of an aircraft fuselage.

Based on its location calculations on the second side, measurement device 138 may then determine spatial x, y, and z coordinates in external coordinate system 150 for each of corner cube 132 and corner cube 134. Again, other coordinate systems may be used. Possibly internal coordinate system 148 and external coordinate system 150 may use different coordinate systems, though in an illustrative embodiment preferably these two coordinate systems use the same coordinate system. Different coordinate systems may be used when a translation system is provided that translates coordinates from one system into coordinates of the other system. In an embodiment internal coordinate system 148 may be referred to as first coordinate system. In an embodiment, external coordinate system 150 may be referred to as second coordinate system.

Then, because the distances from each of corner cube 132 and corner cube 134 to first point 112 may be determined based in part on knowledge of distance to second point 114 and knowledge of thickness of structure 104, the location coordinates of second point 114 may be calculated in external coordinate system 150. External coordinate system 150 may be a spatial coordinate system for second side 108 of structure 104, which may be the exterior surface of an aircraft fuselage.

Measurement device 136 and measurement device 138 may communicate with each other and may share information. Measurement device 136, having calculated position coordinates of the first point 112 in internal coordinate system 148, may communicate with measurement device 138 that has calculated position coordinates of first point 112 in external coordinate system 150.

System 100 also includes computer 152 that may be a general purpose computer. General purpose computers are described with respect to FIG. 8. System 100 also includes application 154 that may execute fully or partially on computer 152. Application 154 may perform processing of data generated by measurement device 136 and measurement device 138. While internal coordinate system 148 and external coordinate system 150 are depicted in FIG. 1a as being stored in computer 152, in an embodiment internal coordinate system 148 and external coordinate system 150 are stored in a device other than computer 152.

First bar 116, second bar 118, and their components may be collectively referred to as the first pair 156. As noted, illustrative embodiments provide for the use of three pairs of internal and externally placed bars, of which first bar 116 and second bar 118 and their components are first pair 156, to be positioned at three separate points on structure 104, of which an aircraft fuselage is an example. Each of the three separate points may be located at holes in structure 104, of which first hole 110 is an example and of which a rivet hole in an aircraft fuselage may be an example. Three pairs of bars may be used because spatial x, y, and z coordinates of three separate points on first side 106, of which first point 112 is one, are calculated both in internal coordinate system 148 describing first side 106 and external coordinate system 150 describing second side 108.

FIG. 1a also depicts second pair 158 that includes third bar 160 and fourth bar 162. Second pair 158, its component third bar 160 and fourth bar 162, and their components may be identical to or similar to first pair 156, its component first bar 116 and second bar 118, and their components. Third bar 160 includes corner cube 164 and corner cube 166. Fourth bar 162 includes corner cube 168 and corner cube 170. Third bar includes third end 172 which is proximate structure 104 and shank 174.

Shank 174 protrudes through structure 104 at third hole 176. Fourth bar 162 includes fourth end 178 and fourth hole 180 into which shank 174 is inserted. Third bar 160 abuts structure 104 on first side 106 at third point 182. Fourth bar 162 abuts structure 104 on second side 108 at fourth point 184.

Measurement device 136 projects laser beam 140b and laser beam 142b at corner cube 164 and corner cube 166, respectively, which then reflect laser beam 140b and laser beam 142b back to measurement device 136. Measurement device 138 similarly projects laser beam 144b and laser beam 146b at corner cube 168 and corner cube 170, which reflect laser beam 144b and laser beam 146b back to measurement device 138.

Similar to the actions associated with first pair 156, measurement device 136 analyzes reflected laser beam 140b and reflected laser beam 142b to determine locations of corner cube 164 and corner cube 166, respectively, relative to each other and measurement device 136. Measurement device 138 analyzes reflected laser beam 144b and reflected laser beam 146b to determine locations of corner cube 168 and corner cube 170, respectively, relative to each other and measurement device 138.

Based on its location calculations on first side 106, measurement device 136 may then determine spatial location coordinates in internal coordinate system 148 for each of corner cube 164 and corner cube 166. Based in part on the known locations of each of each of corner cube 164 and corner cube 166 relative to third point 182, the location coordinates of third point 182 in internal coordinate system 148 may be calculated.

Based on its location calculations on the second side 108, measurement device 138 may then determine spatial coordinates in external coordinate system 150 for each of corner cube 168 and corner cube 170. Then, because the locations of each of corner cube 168 and corner cube 170 relative to third point 182 may be determined based in part on knowledge of distance to fourth point 184 and knowledge of thickness of structure 104, location coordinates of third point 182 may be calculated in external coordinate system 150. As noted above, external coordinate system 150 may be a spatial coordinate system for second side 108 of structure 104, which may be the exterior surface of an aircraft fuselage.

FIG. 1a also depicts third pair 186 that includes fifth bar 188 and sixth bar 190. Third pair 186, its component fifth bar 188 and sixth bar 190, and their components may be identical to or similar to first pair 156, its component first bar 116 and second bar 118, and their components. Third pair 186, its component fifth bar 188 and sixth bar 190, and their components may be also be identical to or similar to second pair 158, its component third bar 160 and fourth bar 162, and their components.

Fifth bar 188 includes corner cube 192 and corner cube 194. Sixth bar 190 includes corner cube 196 and corner cube 198. Fifth bar 188 includes fifth end 200 which is proximate structure 104 and includes shank 202. Shank 202 protrudes through structure 104 at fifth hole 204. Sixth bar 190 includes sixth end 206 and sixth hole 208 into which shank 202 is inserted. Fifth bar 188 abuts structure 104 on first side 106 at fifth point 210. Sixth bar 190 abuts structure 104 on second side 108 at sixth point 212.

Measurement device 136 projects laser beam 140c and laser beam 142c at corner cube 192 and corner cube 194, respectively, which then reflect laser beam 140c and laser beam 142c back to measurement device 136. Measurement device 138 similarly projects laser beam 144c and laser beam 146c at corner cube 196 and corner cube 198, which reflect laser beam 144c and laser beam 146c back to measurement device 138.

Similar to the actions associated with first pair 156 and second pair 158, measurement device 136 analyzes reflected laser beam 140c and reflected laser beam 142c to determine locations of corner cube 192 and corner cube 194, respectively, relative to each other and measurement device 136. Likewise, measurement device 138 analyzes reflected laser beam 144c and reflected laser beam 146c to determine locations of corner cube 196 and corner cube 198, respectively, relative to each other and measurement device 138.

Based on its location calculations on first side 106, measurement device 136 may then determine spatial location coordinates in internal coordinate system 148 for each of corner cube 192 and corner cube 194. Based in part on the known distances from each of each of corner cube 192 and corner cube 194 to fifth point 210, the location coordinates of fifth point 210 in the internal coordinate system 148 may be calculated.

Based on its distance calculations on second side 108, measurement device 138 may then determine spatial coordinates in external coordinate system 150 for each of corner cube 196 and corner cube 198. Then, because the distances from each of each of corner cube 196 and corner cube 198 to fifth point 210 may be determined based in part on knowledge of distance to sixth point 212 and knowledge of thickness of structure 104, location coordinates of fifth point 210 may be calculated in external coordinate system 150. As noted, external coordinate system 150 may be a spatial coordinate system for second side 108 of structure 104, which may be the exterior surface of an aircraft fuselage.

By calculating spatial coordinate locations of first point 112, third point 182, and fifth point 185, measurement device 136 may determine locations of first point 112, third point 182, and fifth point 210 in internal coordinate system 148. By calculating spatial coordinate locations of second point 114, fourth point 184, and sixth point 212, measurement device 138 may determine locations of second point 114, fourth point 184, and sixth point 212 in external coordinate system 150. Because distances are known from the second point 114, fourth point 184, and sixth point 212 to the first point 112, third point 182, and fifth point 210 (that is, thickness of structure 104), respectively, external coordinate system 150 may be oriented or mapped to first point 112, third point 182, and fifth point 210. Accordingly, external coordinate system 150 may be mapped to internal coordinate system 148. Objects moving in a coordinate frame of the external coordinate system 150 may effectively do so in accordance with the internal coordinate system 148.

As noted, each one of first bar 116, second bar 118, third bar 160, fourth bar 162, fifth bar 188, and sixth bar 190 may have two or more corner cubes. When two corner cubes are used on at least one of first bar 116, second bar 118, third bar 160, fourth bar 162, fifth bar 188, and sixth bar 190, corner cubes are aligned with first point 112, third point 182, or fifth point 210 for first bar 116, third bar 160, or fifth bar 188. When more than two corner cubes are affixed on at least one of first bar 116, second bar 118, third bar 160, fourth bar 162, fifth bar 188, and sixth bar 190, corner cubes need not be linearly aligned with their respective proximate one of first point 112, third point 182, or fifth point 210.

While corner cube 128, corner cube 130, corner cube 132, corner cube 134, corner cube 164, corner cube 166, corner cube 168, corner cube 170, corner cube 192, corner cube 194, corner cube 196, and corner cube 198 may be depicted in FIG. 1a as diamonds or rotated squares, corner cube 128, corner cube 130, corner cube 132, corner cube 134, corner cube 164, corner cube 166, corner cube 168, corner cube 170, corner cube 192, corner cube 194, corner cube 196, and corner cube 198 may be round or shaped in another manner and may also be recessed into their respective one of first bar 116, second bar 118, third bar 160, fourth bar 162, fifth bar 188, and sixth bar 190. Further, while first bar 116, second bar 118, third bar 160, fourth bar 162, fifth bar 188, and sixth bar 190 appear in FIG. 1a to be similar to each other, in an embodiment each of first bar 116, second bar 118, third bar 160, fourth bar 162, fifth bar 188, and sixth bar 190 are different from each other in length, width, and other physical dimensions and may vary in terms of quantity of corner cube 128, corner cube 130, corner cube 132, corner cube 134, corner cube 164, corner cube 166, corner cube 168, corner cube 170, corner cube 192, corner cube 194, corner cube 196, and corner cube 198 affixed to first bar 116, second bar 118, third bar 160, fourth bar 162, fifth bar 188, and sixth bar 190, respectively.

In an embodiment, each of first bar 116, second bar 118, third bar 160, fourth bar 162, fifth bar 188, and sixth bar 190 may be several inches in length, for example three inches in length. In an embodiment, corner cubes may be two inches apart from each other on at least one of first bar 116, second bar 118, third bar 160, fourth bar 162, fifth bar 188, and sixth bar 190. In an embodiment, first bar 116, second bar 118, third bar 160, fourth bar 162, fifth bar 188, and sixth bar 190 are made from aluminum. In an embodiment, corner cube 128, corner cube 130, corner cube 132, corner cube 134, corner cube 164, corner cube 166, corner cube 168, corner cube 170, corner cube 192, corner cube 194, corner cube 196, and corner cube 198 within first bar 116, second bar 118, third bar 160, fourth bar 162, fifth bar 188, and sixth bar 190, respectively, are separated from each other by a half round spacer installed inside first bar 116, second bar 118, third bar 160, fourth bar 162, fifth bar 188, and sixth bar 190, respectively.

Application 154, measurement device 136, and measurement device 138 working alone or in some combination may perform processing as described herein and exhibit processing power and flexibility to handle situations wherein quantity and placement of corner cube 128, corner cube 130, corner cube 132, corner cube 134, corner cube 164, corner cube 166, corner cube 168, corner cube 170, corner cube 192, corner cube 194, corner cube 196, and corner cube 198 may vary between first bar 116, second bar 118, third bar 160, fourth bar 162, fifth bar 188, and sixth bar 190. While first pair 156, second pair 158, and third pair 186 may appear in FIG. 1a to be of equal distance from each other on structure 104, and may appear to be linearly aligned, in an embodiment, first pair 156, second pair 158, and third pair 186 are of varying distance from each other and are not linearly aligned on structure 104.

First bar 116, second bar 118, third bar 160, fourth bar 162, fifth bar 188, and sixth bar 190 may in some embodiments be referred to as "hidden point bars" because their respective first point 112, second point 114, third point 182, fourth point 184, fifth point 185, and sixth point 197 at which the bars meet their respective surfaces of structure 104 need not be visible in order to have their spatial coordinates determined. Because illustrative embodiments provide that distances between corner cubes and the points at which their respective bars meet the surface of structure 104 are known, measurement device 136 and measurement device 138 may determine locations of first point 112, third point 182, and fifth point 185 and second point 114, fourth point 184, and sixth point 197, respectively, in internal coordinate system 148 or external coordinate system 150, respectively, without needing a line of sight to the points. Measurement device 136 and measurement device 138, that may handle processing with application 154 executing on computer 152, determine coordinates for first point 112, third point 182, and fifth point 210 and second point 114, fourth point 184, and sixth point 212, respectively, based on the known information and based on distance determinations as taught herein to corner cube 128, corner cube 130, corner cube 132, corner cube 134, corner cube 164, corner cube 166, corner cube 168, corner cube 170, corner cube 192, corner cube 194, corner cube 196, and corner cube 198. First point 112, second point 114, third point 182, fourth point 184, fifth point 185, and sixth point 197 need not be visible to measurement device 136 or measurement device 138 for coordinate locations of the points to be determined, hence the use of the term "hidden point bars" in some embodiments. Use of the term "hidden" in some embodiment may not describe structural features or method operations that limit the claimed inventions. Rather, use of the term "hidden" may only used as a convenient nomenclature.

Aircraft 102 is depicted in FIG. 1a with a bracket that includes first pair 156, second pair 158, third pair 186, and structure 104, items that are either permanent components of aircraft 102 or temporarily affixed or attached to aircraft 102 for purposes described herein. Components that are not part of aircraft 102 and may not be physically attached to aircraft 102 include computer 152, measurement device 136, measurement device 138, and laser beams projected and received by measurement device 136, measurement device 138.

Figure 1B:
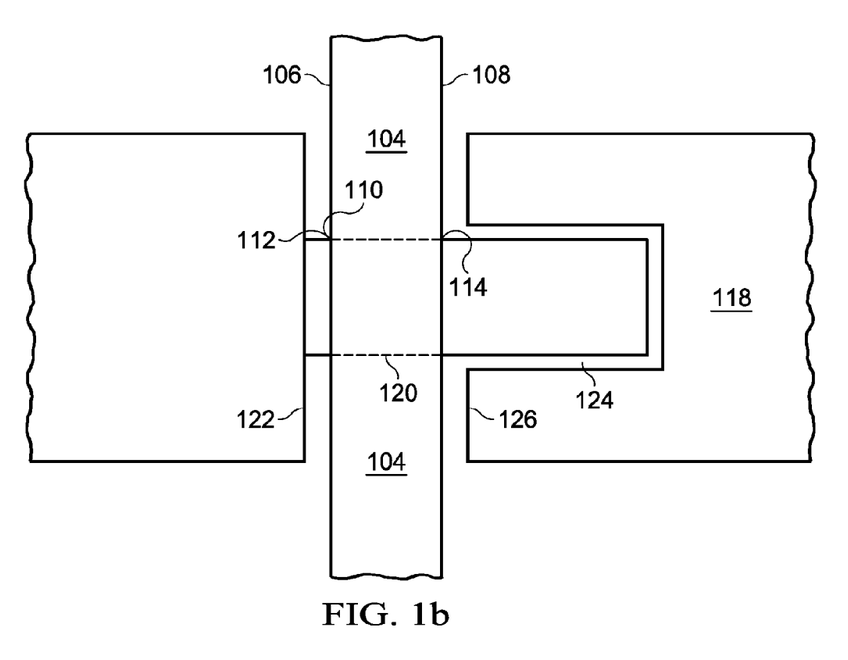
FIG. 1b is a block diagram of a system of dual hidden point bars in accordance with an illustrative embodiment.

FIG. 1b is a block diagram of a system of dual hidden point bars in accordance with an illustrative embodiment. There are no differences intended between FIG. 1a and FIG. 1b. FIG. 1b merely depicts selected components of system 100 in a "zoomed in" and more detailed and accurate view for illustration purposes. FIG. 1b depicts components of first bar 116 and second bar 118 in the area of structure 104. While it may appear that the components in FIG. 1b are loosely associated with each other and may not touch each other, in fact the components of FIG. 1b fit together snugly as discussed elsewhere herein. Space between some components in FIG. 1b is provided for illustration purposes.

As noted, FIG. 1b is provided to depict some components of system 100 in greater detail. Where any differences may be found between FIG. 1b and FIG. 1a, FIG. 1b may take precedence because of the greater detail FIG. 1b provides. First hole 110 and first point 112 are directed to the same location in FIG. 1b because first point 112 is defined as location of first hole 110 on first side 106. Second point 114 is location of first hole 110 on second side 108. Second hole 124 points to an empty space in FIG. 1b. While second hole 124, like first hole 110, is not a tangible object per se, it is still a component of FIG. 1b as well as FIG. 1a. Shank 120 is depicted in FIG. 1a and FIG. 1b with a dotted because shank 120 would not be visible at it is inserted through first hole 110 and snugly into second hole 124.

Figure 2:
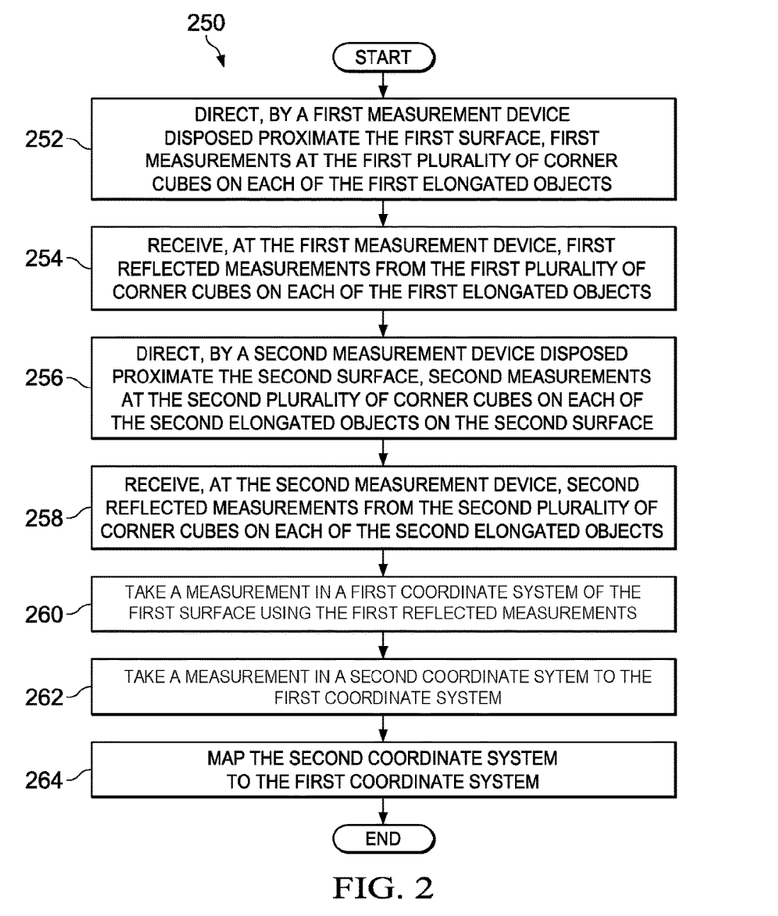
FIG. 2 is a flowchart of a method of dual hidden point targets in accordance with an illustrative embodiment.

FIG. 2 is a flowchart of a method of dual hidden point targets in accordance with an illustrative embodiment. FIG. 2 is a flowchart of a method 250 implemented using a system comprising a first, a second, and a third pair of elongated objects wherein each pair of elongated objects comprises a first elongated object and a second elongated object positioned at one of a first point, a third, point, and a fifth point on opposite first and second surfaces, respectively, of a structure and wherein each of the first and second elongated objects in the first, the second, and the third pair contains a first plurality and a second plurality, respectively of corner cubes affixed at known locations from each other on the first and second elongated objects and from the first point, the second point, and the third point, respectively, on the first surface. Method 250 shown in FIG. 2 may be implemented using system 100 of FIG. 1a and FIG. 1b.

Figure 8:
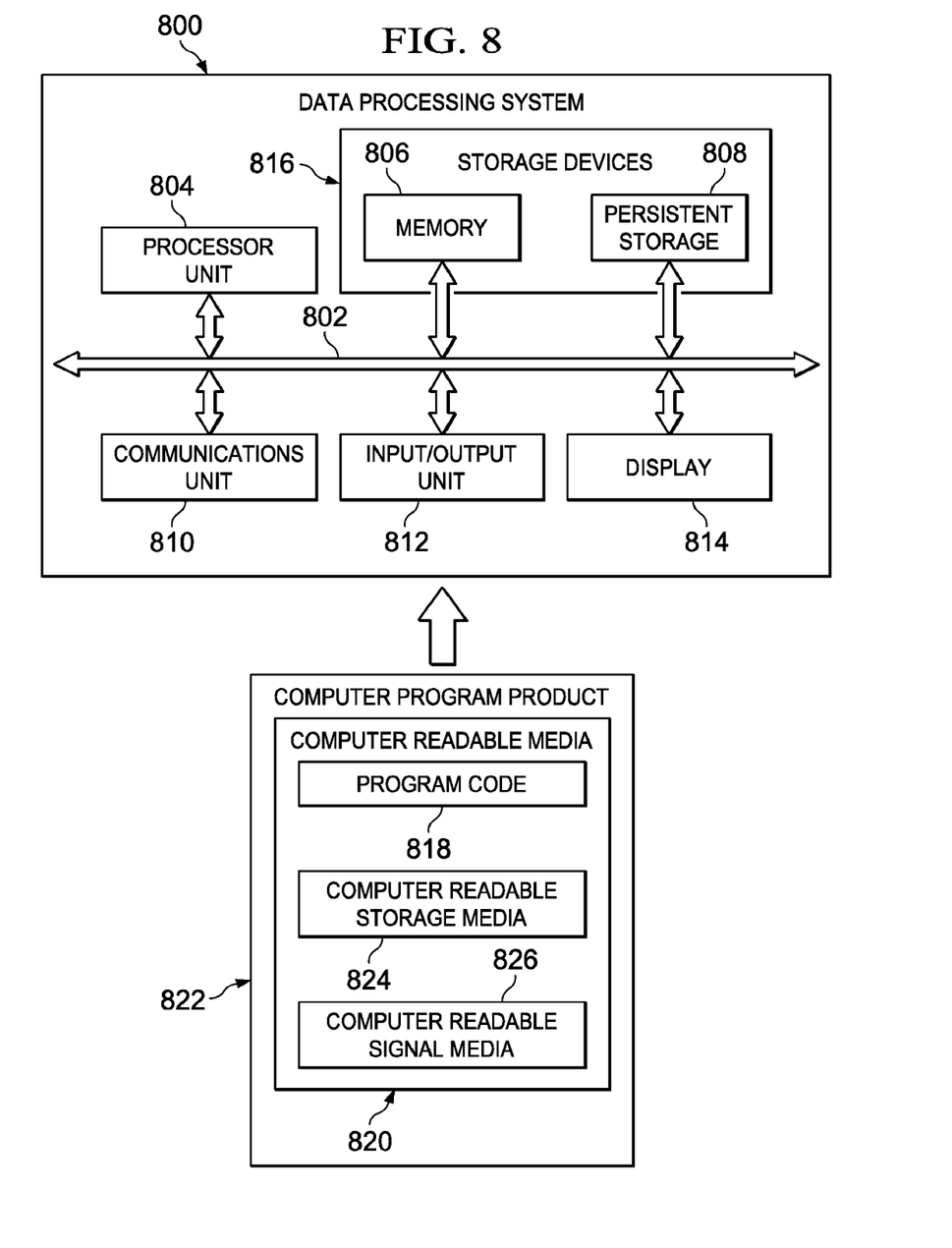
FIG. 8 is an illustration of a data processing system, in accordance with an illustrative embodiment.

The process shown in FIG. 2 may be implemented by a processor, such as processor unit 804 of FIG. 8. The process shown in FIG. 2 may be a variation of the techniques described in FIG. 1a, FIG. 1b and FIG. 3 through FIG. 8. Although some of the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 250 may begin as a first measurement device disposed proximate the first surface may direct first measurements at the first plurality of corner cubes on each of the first elongated objects (operation 252). Next, the process may receive, at the first measurement device, first reflected measurements from the first plurality of corner cubes on each of the first elongated objects (operation 254). Next, a second measurement device disposed proximate the second surface may direct second measurements at the second plurality of corner cubes on each of the second elongated objects on the second surface (operation 256).

Next, the process may receive, at the second measurement device, second reflected measurements from the second plurality of corner cubes on each of the second elongated objects (operation 258). Next, the process may take a first measurement in a first coordinate system of the first surface using the first reflected measurements (operation 260). Next, the process may take a second measurement in a second coordinate system of the second surface using the second reflected measurements (operation 262). Next, the process may map the second coordinate system to the first coordinate system (operation 264). Method 250 may terminate thereafter.

First coordinate system provided by method 250 may correspond to internal coordinate system 148 provided by system 100 depicted in FIG. 1a and FIG. 1b. Second coordinate system provided by method 250 may correspond to external coordinate system 150 provided by system 100 depicted in FIG. 1a and FIG. 1b. First surface provided by method 250 may correspond to first side 106 of structure 104 provided by system 100 depicted in FIG. 1a and FIG. 1b. Second surface provided by method 250 may correspond to second side 108 of structure 104 provided by system 100 depicted in FIG. 1a and FIG. 1b.

Figure 3:
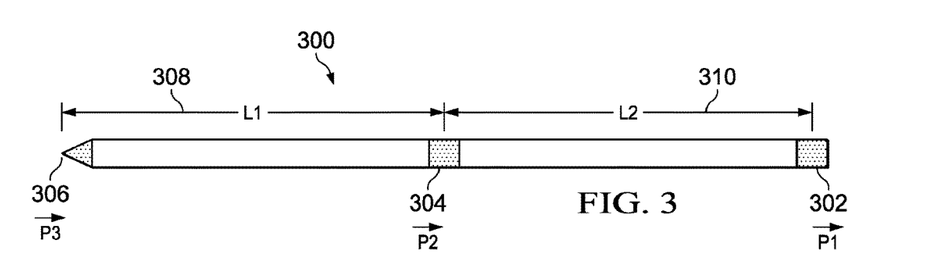
FIG. 3 is a diagram of a hidden point bar in accordance with an illustrative embodiment.

FIG. 3 is a diagram of a hidden point bar in accordance with an illustrative embodiment. FIG. 3 depicts hidden point bar 300 that in an embodiment may be at least one of first bar 116, second bar 118, third bar 160, fourth bar 162, fifth bar 188, and sixth bar 190 depicted in FIG. 1a and partially in FIG. 1b. Bar 300 is depicted with two corner cubes represented by P1 and reference numeral 302 and represented by P2 and reference numeral 304 in FIG. 3. Bar 300 is also depicted with one point at which bar 300 may make contact with a surface, such as an interior surface of an aircraft fuselage. However, the illustrative embodiments may be used in other forms of manufacturing, including vehicle manufacturing, building manufacturing, or other device manufacturing. The point is represented as P3 and reference numeral 306 in FIG. 1a.

FIG. 3 also depicts two lengths, represented as L1 and L2 and associated with reference numeral 308 and reference numeral 310, respectively. L1 is a distance between P2 and P3. L2 is a distance between P2 and P1. The position of P3 may be a function of a ratio between L1 and L2, scaled by a separation between P1 and P2. Equations for a position of P3 may be:

$$\frac{P3 - P2}{L1} = \frac{P1 - P2}{L2}$$

$$P3(L1, L2, P1, P2) = \frac{L1}{L2} \times (P1 - P2) + P2$$

Figure 4:
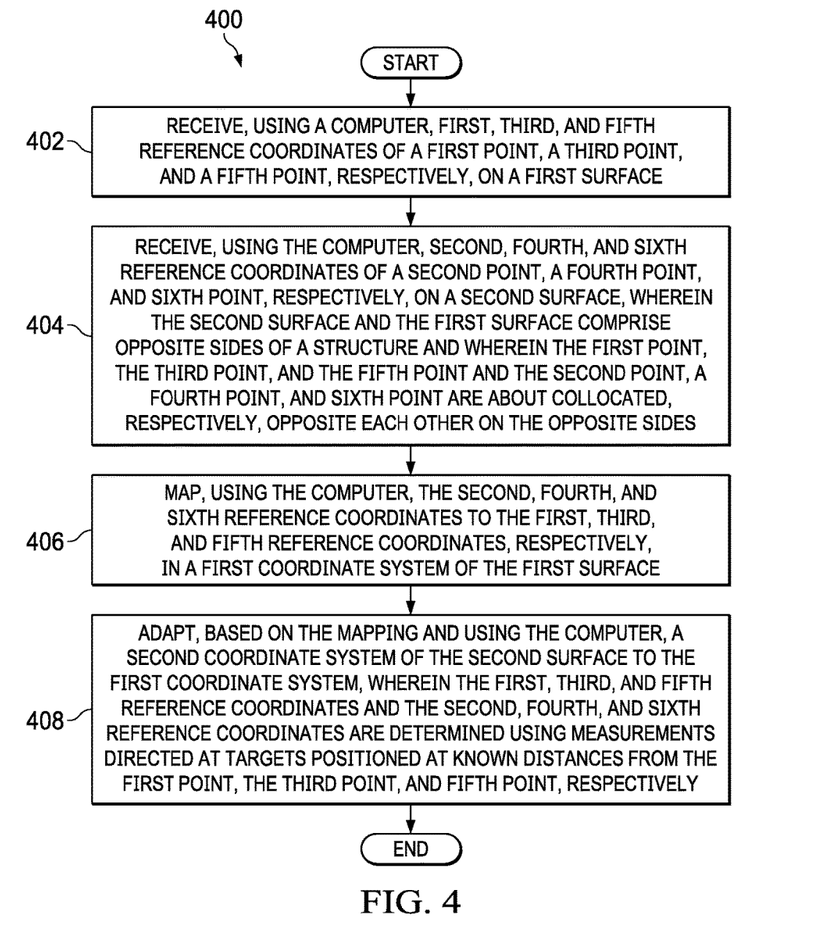
FIG. 4 is a flowchart of a method of dual hidden point targets in accordance with an illustrative embodiment.

FIG. 4 is a flowchart of a method of dual hidden point targets in accordance with an illustrative embodiment. Method 400 shown in FIG. 4 may be implemented using system 100 of FIG. 1a and FIG. 1b. The process shown in FIG. 4 may be implemented by a processor, such as processor unit 804 of FIG. 8. The process shown in FIG. 4 may be a variation of the techniques described in FIG. 1a, FIG. 1b, FIG. 3 and FIG. 5 through FIG. 8. Although some of the operations presented in FIG. 4 are described as being performed by a "process," the operations are being performed by at least one tangible processor or using one or more physical devices, as described elsewhere herein. The term "process" also may include computer instructions stored on a non-transitory computer readable storage medium.

Method 400 may begin as the process may receive, using a computer, first, third, and fifth reference coordinates of a first point, a third, point, and a fifth point, respectively, on a first surface (operation 402). Next, the process may receive, using the computer, second, fourth, and sixth reference coordinates of a second point, fourth point, a and sixth point, respectively, on a second surface, wherein the second surface and the first surface comprise opposite sides of a structure and wherein the first point, the third point, and the fifth point and the second point, fourth point, and sixth point are about collocated, respectively, opposite each other on the opposite sides (operation 404).

Next, the process may map, using the computer, the first, third, and, fifth, and reference coordinates to the second, fourth, and sixth and third reference coordinates, respectively, in a first coordinate system of the first surface (operation 406). Next, the process may adapt, based on the mapping and using the computer, an external coordinate system of the second surface to the internal coordinate system, wherein the first, third, and fifth reference coordinates and the second, fourth, and sixth reference coordinates are determined using lights directed to targets positioned at known distances from the first point, the third point, and fifth point, respectively (operation 408). Method 400 may terminate thereafter.

First coordinate system provided by method 400 may correspond to internal coordinate system 148 provided by system 100 depicted in FIG. 1a. Second coordinate system provided by method 400 may correspond to external coordinate system 150 provided by system 100 depicted in FIG. 1a. First surface provided by method 400 may correspond to first side 106 of structure 104 provided by system 100 depicted in FIG. 1a and FIG. 1b. Second surface provided by method 400 may correspond to second side 108 of structure 104 provided by system 100 depicted in FIG. 1a and FIG. 1b.

Figure 5:
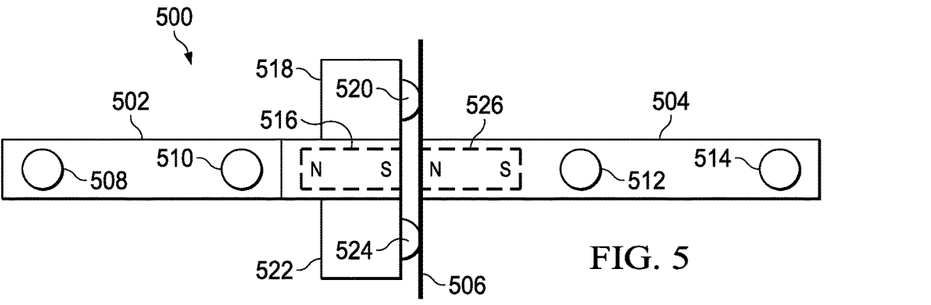
FIG. 5 is a diagram of a hidden point bar in accordance with an illustrative embodiment.

FIG. 5 is a diagram of a hidden point bar in accordance with an illustrative embodiment. In an embodiment, first bar 116, second bar 118, third bar 160, fourth bar 162, fifth bar 188, and sixth bar 190 of the type depicted in FIG. 1a and partially in FIG. 1b may not be positioned near first hole 110, third hole 176, or hole 204, respectively. The illustrative embodiments provide that holes in an aircraft fuselage or other surface are not necessary for adaptation of external coordinate system 150 to internal coordinate system 152 as provided herein. Instead, bars on opposite sides of a surface may be drawn together through the use of magnets attached to or installed inside of bars.

FIG. 5 depicts system 500 that includes interior bar 502 and exterior bar 504 positioned proximate interior and exterior surfaces, respectively, of an aircraft fuselage or other dual-sided structure 506. Mounted on interior bar 502 are corner cube 508 and corner cube 510. Mounted on exterior bar 504 are corner cube 512 and corner cube 514. Interior bar 502 also includes first magnet 516, first roller housing 518, first roller 520, second roller housing 522, and second roller 524. Exterior bar 504 also includes second magnet 526. First roller 520 and second roller 524 may be made of ceramic or another material. First magnet 516 and second magnet 526 may be made of rare earth magnetic material. Interior bar 502 may be moved about surface of structure 506 using first roller 520 and second roller 524 until first magnet 516 and second magnet 526 are satisfactorily aligned.

Figure 6:
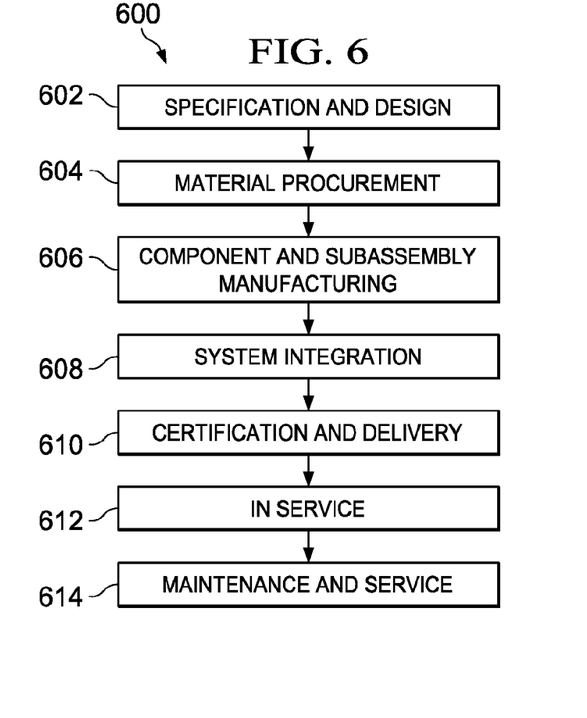
FIG. 6 is a flowchart of a method of manufacturing a commercial aircraft.
Figure 7:
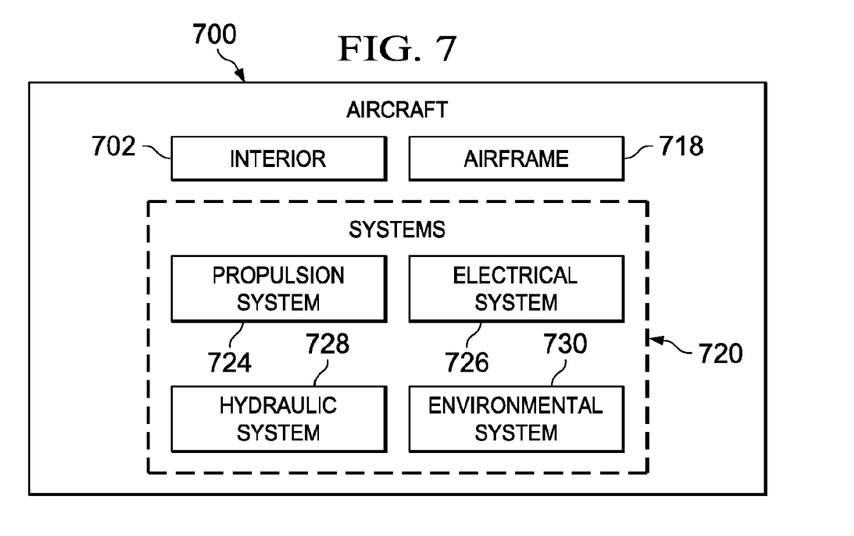
FIG. 7 is a block diagram of a commercial aircraft.

FIG. 6 is a flowchart of a method of manufacturing a commercial aircraft. Referring to FIG. 6 and FIG. 7, embodiments of the disclosure may be described in the context of an aircraft manufacturing and service method 600 as shown in FIG. 6 and aircraft 700 as shown in FIG. 7. During pre-production, aircraft manufacturing and service method 600 may include specification and design 602 of aircraft 700 and material procurement 604. During production, component and subassembly manufacturing 606 and system integration 608 of the aircraft 702 takes place. Thereafter, aircraft 700 may go through certification and delivery 610 in order to be placed in service 612. While in service by a customer, aircraft 700 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation, any number of aircraft manufacturers and major-system subcontractors; a third party may include without limitation, any number of venders, subcontractors, and suppliers; and an operator may be an airline, leasing company, military entity, service organization, and so on.

FIG. 7 is a block diagram of a commercial aircraft. As shown in FIG. 7, aircraft 700 produced by aircraft manufacturing and service method 600 may include an airframe 718 with plurality of systems 720 and interior 702. Examples of high-level systems 720 include one or more of propulsion system 724, electrical system 726, hydraulic system 728, and environmental system 730. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process may be fabricated or manufactured in a manner similar to components or subassemblies produced while aircraft 700 is in service. Also, one or more apparatus embodiments, method embodiments, or a combination thereof may be utilized during the subassembly manufacturing 606 and system integration 608, for example, by substantially expediting assembly of or reducing the cost of aircraft 700. Similarly, one or more of apparatus embodiments, method embodiments, or a combination thereof may be utilized while aircraft 700 is in service, for example and without limitation, to maintenance and service 614.

FIG. 8 is an illustration of a data processing system, in accordance with an illustrative embodiment. Data processing system 800 in FIG. 8 is an example of a data processing system that may be used to implement the illustrative embodiments, such as system 100 of FIG. 1a and FIG. 1b, or any other module or system or process disclosed herein. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

Data processing system 800 may also include at least one associative memory (not shown). Associative memory may be in communication with communications fabric 802. Associative memory may also be in communication with, or in some illustrative embodiments, be considered part of storage devices 816.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of establishing and utilizing a coordinate measurement reference on surface at predetermined locations, comprising:

receiving, by a computer, first, third, and fifth reference coordinates of a first point, a third point, and a fifth point, respectively, on an interior surface, wherein the first point, the third point, and the fifth point need not be in a first line of sight of a first measurement device;

receiving, by a computer, second, fourth, and sixth reference coordinates of a second point, a fourth point, and a sixth point, respectively, on an exterior surface, wherein the second point, the fourth point, and the sixth point need not be in a second line of sight of a second measurement device; wherein the interior surface and the exterior surface comprise opposite sides of a structure and wherein the first point, the third point, and the fifth point and the second point, the fourth-point, and the sixth point are about collocated, respectively, opposite each other on the opposite sides;

mapping, by the computer, the second, fourth, and sixth reference coordinates to the first, third, and fifth reference coordinates, respectively, in an internal coordinate system of the interior surface; and adapting, by the computer, an external coordinate system of the exterior surface to the internal coordinate system according to the mapping of the reference coordinates, wherein an adaptation is formed, and wherein the first, third, and fifth reference coordinates and the second, fourth, and sixth reference coordinates are determined using measurements directed at targets positioned at known distances from the first point, the third point, and fifth point, respectively;

moving and positioning, by the computer, a first robot on the interior surface according to the internal coordinate system;

moving and positioning, by the computer, a second robot on the exterior surface according to the external coordinate system; and coordinating, by the computer, movements and positions of the first robot and the second robot according to the adaptation of the external coordinate system to the internal coordinate system.

2. The method of claim 1, wherein the interior surface is on an interior of an aircraft fuselage and the exterior surface is on an exterior of the aircraft fuselage.

3. The method of claim 1, wherein the targets comprise a first, a third, and a fifth plurality of corner cubes affixed to a first bar, a third bar, and a fifth bar respectively, abutting the interior surface at the first point, the third point, and the fifth point, respectively, wherein the targets further comprise a second, a fourth, and a sixth plurality of corner cubes affixed to a second bar, a fourth bar, and a sixth bar abutting the exterior surface at the second point, fourth, and sixth point, respectively.

4. The method of claim 3, wherein the first, the third, and the fifth plurality of corner cubes on the first bar, the third bar, and the fifth bar, respectively, and the second plurality, the fourth plurality, and the sixth plurality of corner cubes on the second, fourth, and sixth bar, respectively, are affixed at known distances from each other and are affixed at known distances from the first point, the third point, and the fifth point, respectively.

5. The method of claim 3, wherein the first bar attaches to the second bar through a first hole in the structure, wherein the third bar attaches to the fourth bar through a third hole in the structure, and wherein the fifth bar attaches to the sixth bar through a fifth hole in the structure.

6. The method of claim 5, wherein shanks protruding from ends of the first bar, the third bar, and the fifth bar abutting the interior surface pass through the first hole, the third hole, and the fifth hole, respectively, are inserted into a second hole, a fourth hole, and a sixth hole, respectively, in the ends of the second bar, the fourth bar, and the sixth bar abutting the exterior surface.

7. The method of claim 6, wherein insertion of the shanks through the first hole, the third hole, and the fifth hole in the structure and into the second hole, the fourth hole, and the sixth hole of the second bar, the fourth bar, and the sixth bar, respectively, enables the first bar and the second bar, the third bar and the fourth bar, and the fifth bar and the sixth bar, respectively, to abut the interior surface and the exterior surface, respectively, in a flush manner.

8. The method of claim 2, wherein the measurements comprise laser lights and wherein the first measurement device and the second measurement device are situated at the interior of the aircraft fuselage and at the exterior of the fuselage project lasers from known distances to a first plurality, a third plurality, and a fifth plurality of corner cubes and a second plurality, a fourth plurality, and a sixth plurality of corner cubes, respectively, to determine the first reference coordinates and the second reference coordinates, respectively.

9. The method of claim 3, wherein the measurements are taken at least using a first measurement device directed at the first, third, and fifth corner cubes.

10. The method of claim 9, wherein the first measurement device is disposed proximate the internal surface.

11. The method of claim 10, wherein first measurement device receives reflected measurements from the first, third, and fifth corner cubes.

12. The method of claim 11, wherein the measurements are also taken using a second measurement device directed at the second, fourth, and sixth corner cubes.

13. The method of claim 12, wherein the second measurement device is disposed proximate the external surface.

14. The method of claim 13, wherein second measurement device receives reflected measurements from the second, fourth, and sixth corner cubes.

15. The method of claim 14, wherein the first measurement device comprises a first laser and wherein the second measurement device comprises a second laser.

16. The method of claim 14, wherein the first, second, third, fourth, fifth, and sixth corner cubes comprise mirrors.

17. The method of claim 16 further comprising:
determining coordinate positions for points on the first bar and the second bar that are hidden by the structure or by a first hole.

18. The method of claim 17 further comprising:
performing a manufacturing operation using the first robot and the second robot.

19. The method of claim 18, wherein the manufacturing operation comprises riveting a structure.

20. The method of claim 19, wherein the structure comprises an aircraft.

* * * * *